United States Patent
Takata (10) Patent No.: US 8,084,957 B2
(45) Date of Patent: *Dec. 27, 2011

(54) ILLUMINATING APPARATUS FOR DISPLAY DEVICE AND DISPLAY DEVICE HAVING SAME

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 384 days.

This patent is subject to a terminal disclaimer.

(21) Appl. No.: 12/296,453

(22) PCT Filed: Feb. 14, 2007

(86) PCT No.: PCT/JP2007/052614
§ 371 (c)(1),
(2), (4) Date: Oct. 8, 2008

(87) PCT Pub. No.: WO2008/004350
PCT Pub. Date: Jan. 10, 2008

(65) Prior Publication Data
US 2009/0121649 A1    May 14, 2009

(30) Foreign Application Priority Data
Jul. 3, 2006   (JP) ................................. 2006-183781

(51) Int. Cl.
*G05F 1/00* (2006.01)
*H01J 65/00* (2006.01)

(52) U.S. Cl. ........ 315/291; 315/312; 315/294; 315/307; 313/607; 313/268; 362/97.1

(58) Field of Classification Search .............. 315/306, 315/291, 294, 277, 224, 219, 209 R, 312, 315/307; 363/71, 131; 362/97.1; 313/607, 313/268

See application file for complete search history.

(56) References Cited

U.S. PATENT DOCUMENTS

| | | | |
|---|---|---|---|
| 7,334,928 B2 * | 2/2008 | Gu et al. ........................ | 362/560 |
| 7,391,166 B2 * | 6/2008 | Ushijima et al. .............. | 315/276 |
| 7,391,167 B2 * | 6/2008 | Jang et al. ..................... | 315/291 |
| 7,489,091 B2 * | 2/2009 | Kim et al. ..................... | 315/324 |
| 7,589,478 B2 * | 9/2009 | Ushijima et al. .............. | 315/277 |

(Continued)

FOREIGN PATENT DOCUMENTS

JP    11-111039 A    4/1999

(Continued)

OTHER PUBLICATIONS

Official Communication issued in International Patent Application No. PCT/JP2007/052614, mailed on Apr. 3, 2007.
Takata: "Cold-Cathode Lamp, and Display Illumination Device and Display Device Therewith," U.S. Appl. No. 12/295,311, filed Sep. 30, 2008.
Takata: "Cold Cathode Lamp, and Display Illumination Device for Display Device and Display Device Provided Therewith," U.S. Appl. No. 12/295,324, filed Sep. 30, 2008.

(Continued)

*Primary Examiner* — Vibol Tan
(74) *Attorney, Agent, or Firm* — Keating & Bennett, LLP (57) ABSTRACT

An illuminating apparatus used for a display device includes a plurality of illuminating units, each of which includes a first feeding member, a second feeding member, and a cold-cathode tube lamp that is fed by a power supply apparatus via the first and second feeding members. An equivalent circuit of each illuminating unit is a series combination of negative resistor and a capacitor connected to an end of the negative resistor. The illuminating units are arranged such that the capacitors of the cold-cathode tube lamps are alternate in position. This can reduce the brightness gradient for the position in the tubular axis direction of the lamp.

5 Claims, 5 Drawing Sheets

U.S. PATENT DOCUMENTS

| | | | |
|---|---|---|---|
| 7,638,945 B2 * | 12/2009 | Takata | 313/607 |
| 7,663,322 B2 * | 2/2010 | Kim et al. | 315/276 |
| 2006/0197424 A1 | 9/2006 | Takata | |

FOREIGN PATENT DOCUMENTS

| | | |
|---|---|---|
| JP | 2003-036723 A | 2/2003 |
| WO | 2007/132542 A1 | 11/2007 |
| WO | 2007/132543 A1 | 11/2007 |

OTHER PUBLICATIONS

Takata: "Illumination Device for Display Device and Display Device Provided Therewith," U.S. Appl. No. 12/295,384, filed Sep. 30, 2008.
Takata: "Holding Member, Illumination Device for Display Device Having the Holding Member, and Display Device Having the Holding Member," U.S. Appl. No. 12/300,652, filed Nov. 13, 2008.

* cited by examiner

POSITION IN TUBULAR AXIS
DIRECTION OF LAMP

ILLUMINATING APPARATUS FOR DISPLAY DEVICE AND DISPLAY DEVICE HAVING SAME

BACKGROUND OF THE INVENTION

1. Field of the Invention

The present invention relates to an illuminating apparatus for a display device and a display device having the same, and specifically relates to a display device having a plurality of illuminating units each of which includes a first feeding member, a second feeding member, and a cold-cathode tube lamp to which power is supplied from a power supply apparatus via the first and second feeding members, the equivalent circuit of each of the illuminating units being a series combination of a negative resistor and a capacitor connected to an end of the negative resistor.

2. Description of the Related Art

Since typical cold-cathode tube lamps used as a light source for display devices have a non-linear negative impedance characteristic, they cannot be driven in parallel. Thus, power supply circuits are normally provided one for each cold-cathode tube lamp. This, however, requires as many power supply circuits as cold-cathode tube lamps causing cost increases. This is disadvantageous also in terms of downsizing, weight reduction, and cost reduction.

Examples of a lamp in which the above problems are solved include the cold-cathode tube lamp disclosed in a patent application that has already been filed by the applicant of this application (see WO2006/051698A1). A circuit formed of a first feeding member, a second feeding member, and a cold-cathode tube lamp of WO2006/051698A1 to which power is supplied from a power supply apparatus via the first and second feeding members, whose equivalent circuit is a series combination of a negative resistor and a capacitor at least at one end of the negative resistor, has a nonlinear positive impedance characteristic; thus, the lamp disclosed in WO2006/051698A1 can be turned on in parallel by being driven in parallel.

In addition to an illuminating unit formed of a first feeding member, a second feeding member, and a cold-cathode tube lamp to which power is supplied from a power supply apparatus via the first and second feeding members, its equivalent circuit being a series combination of a negative resistor and a capacitor connected to one end of the negative resistor and a capacitor connected to the other end of the capacitor, WO2006/051698A1 discloses an illuminating unit formed of a first feeding member, a second feeding member, and a cold-cathode tube lamp to which power is supplied from a power supply apparatus via the first and second feeding members, its equivalent circuit being a series combination of a negative resistor and a capacitor connected to one end of the negative resistor.

Figure 8A:
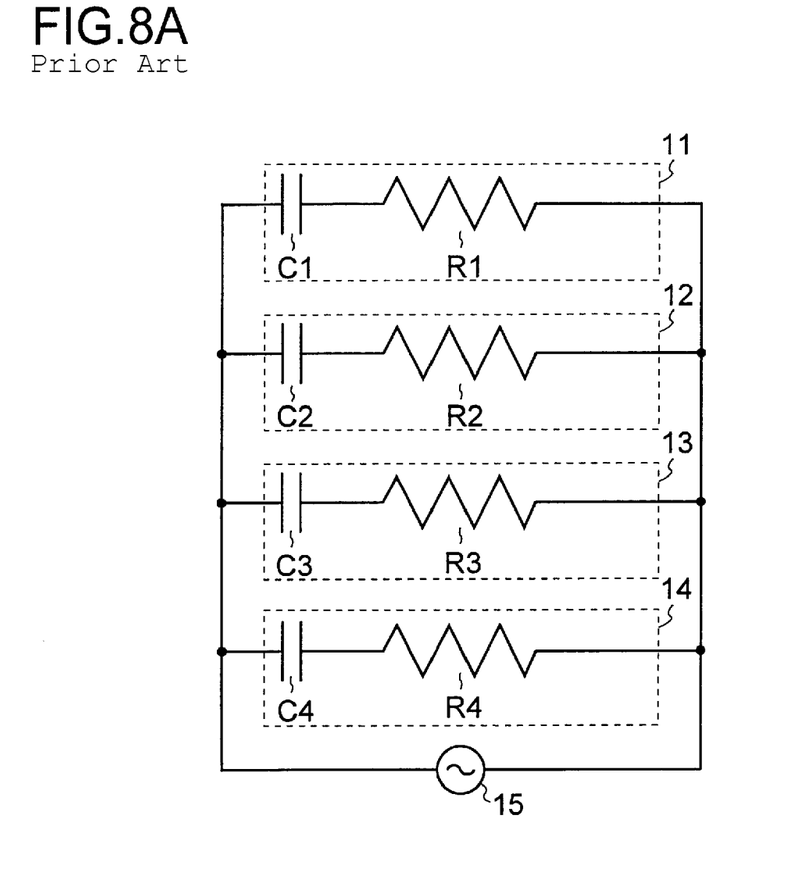
FIG. 8A is a diagram showing an equivalent circuit of a conventional illuminating apparatus for a display device.
Figure 8B:
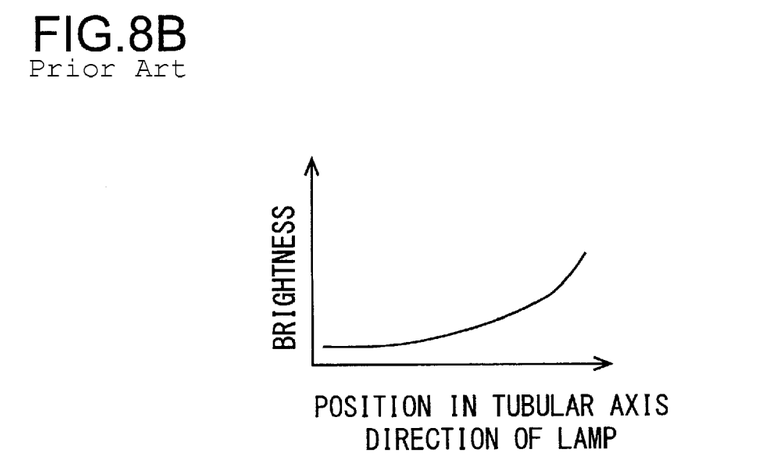
FIG. 8B is a diagram showing the distribution of brightness of the conventional illuminating apparatus for a display device.

In an illuminating apparatus for a display device incorporating more than one of the latter illuminating unit, that is, the illuminating unit formed of a first feeding member, a second feeding member, and a cold-cathode tube lamp to which power is supplied from a power supply apparatus via the first and second feeding members, its equivalent circuit being a series combination of a negative resistor and a capacitor connected to one end of the negative resistor, when, as shown in FIG. 8A, capacitors C1 to C4 which are components of the equivalent circuits 11 to 14 of the illuminating units, respectively, are disposed in the same position, even if the phase of a voltage outputted from one end of a power supply apparatus 15 and the phase of a voltage outputted from the other end of the power supply apparatus 15 are substantially 180 degrees inverted to each other, the voltage at an end portion of each of the resistors R1 to R4 at a side thereof to which a capacitor is connected is lower than the voltage at an end portion of each of the resistors R1 to R4 at a side thereof to which no capacitor is connected. This reduces the brightness at the side where capacitors C1 to C4 are disposed, and increases the brightness at the side where the capacitors C1 to C4 are not disposed as shown in FIG. 8B, and as a result, the brightness gradient in the tubular axis direction of the lamps becomes quite high. When, as shown in FIG. 8A, the capacitors C1 to C4, which are components of the equivalent circuits 11 to 14 of the illuminating units, respectively, are disposed in the same position, noise and sounding occur in a concentrated manner at the same position, which is not preferable.

SUMMARY OF THE INVENTION

In order to overcome the above problems, preferred embodiments of the present invention provide an illuminating apparatus for a display device with a low brightness gradient in the tubular axis direction of a lamp, and a display device including such a novel illuminating apparatus.

According to a preferred embodiment of the present invention, an illuminating apparatus for a display device includes a plurality of illuminating units having: a first feeding member; a second feeding member; and a cold-cathode tube lamp to which power is supplied from a power supply apparatus via the first and second feeding members, an equivalent circuit of each of the illuminating units being a series combination of a negative resistor and a capacitor connected to an end of the negative resistor. Here, at least one of the illuminating units is arranged such that the capacitor thereof is opposite in position to the capacitor of each of other ones of the illuminating units.

With this structure, compared with a structure in which all the capacitors of the illuminating apparatuses are disposed in the same position (see FIG. 8A), uneven distribution of stray capacitors through which a leakage current flows can be reduced, and the gradient of brightness can be made lower. In addition, concentrated occurrence of noise and sounding can also be reduced.

According to a preferred embodiment of the present invention, it is preferable that a number of the illuminating units the capacitor of each of which is disposed in one position in a direction of a tubular axis of the cold-cathode tube lamp be equal to a number of the illuminating units the capacitor of each of which is disposed in a counter position that is opposite to the one position, the capacitor being a component of the equivalent circuit.

With this structure, since the stray capacitors through which a leakage current flows can be symmetrically located in the one position and the counter position, the brightness gradient of the illuminating apparatus, seen as a whole, is symmetrical between the one position and the counter position. This results in a lower gradient of brightness. In addition, since the stray capacitors through which a leakage current flows are alternately located in the one position and the counter position, concentrated occurrence of noise and unwanted sounds is prevented.

According to a preferred embodiment of the present invention, it is preferable that the number of the illuminating units the capacitor of each of which is disposed in one position in a direction of a tubular axis of the cold-cathode tube lamp is equal to a number of the illuminating units the capacitor of each of which is disposed in a counter position that is opposite to the one position, the capacitor being a component of the equivalent circuit, and that a position of the capacitor alternate every predetermined number of the cold-cathode tube lamp. Furthermore, it is preferable that the predetermined number be one.

With this structure, the brightness gradient can be lowered more effectively, and the concentration of noise and unwanted sounds can be alleviated more effectively.

According to another preferred embodiment of the present invention, a display device (e.g., a television receiver) includes an illumination apparatus for a display device having the above described structure.

According to various preferred embodiments of the present invention, there can be realized an illuminating apparatus for a display device with a low brightness gradient in the tubular axis direction of a lamp and a display device incorporating the illuminating apparatus.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

A description will be given of preferred embodiments of the present invention with reference to the drawings. An illuminating device for a display device according to a preferred embodiment of the present invention includes a plurality of illuminating units having: a first feeding member; a second feeding member; and a cold-cathode tube lamp to which power is supplied from a power supply apparatus via the first and second feeding members, an equivalent circuit of each of the illuminating units being a series combination of a negative resistor and a capacitor connected to an end of the negative resistor. In addition to the above described illuminating units, the illuminating apparatus for a display device according to a preferred embodiment of the present invention includes an optical sheet and an illuminating unit in which the first and second feeding members are provided and to the front surface of which the cold-cathode tube lamp is fitted. Here, the front surface of the illuminating unit to which the cold-cathode lamp fitted is covered with the optical sheet.

Now, a description will be given of an example of the structure of the above described illuminating units incorporated in the illuminating apparatus for a display device according to a preferred embodiment of the present invention.

Figure 2A:
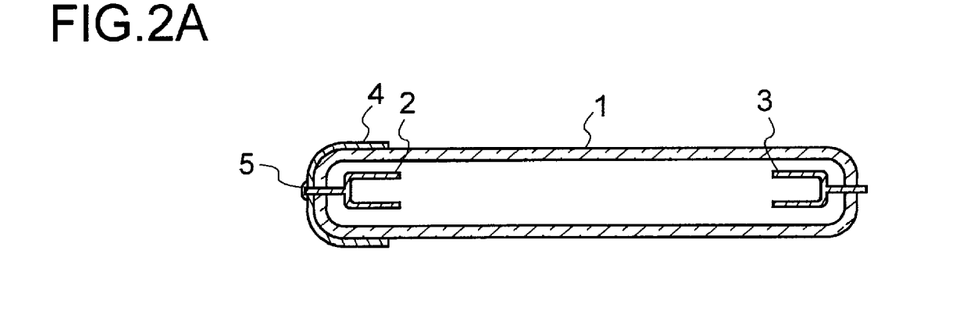
FIG. 2A is a diagram showing an example of the structure of an illuminating unit incorporated in the illuminating apparatus for a display device according to a preferred embodiment of the present invention.
Figure 2B:
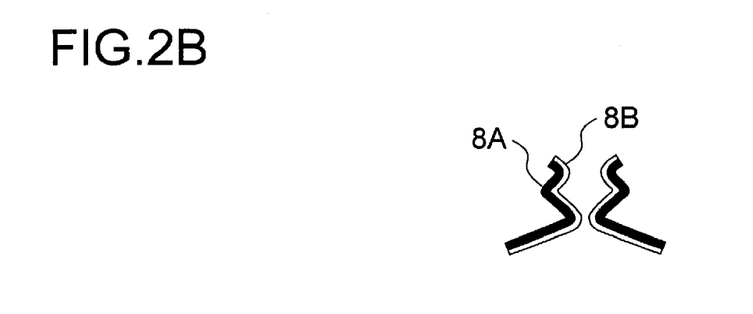
FIG. 2B is a diagram showing the example of the structure of the illuminating unit incorporated in the illuminating apparatus for a display device according to a preferred embodiment of the present invention.

One example of the structure of the illuminating units incorporated in the illuminating apparatus for a display device according to a preferred embodiment of the present invention is a structure provided with a cold-cathode tube lamp having the sectional structure shown in FIG. 2A and a first and a second feeding member shown in FIG. 2B.

The cold-cathode tube lamp shown in FIG. 2A has internal electrodes 2 and 3 inside a glass tube 1. A portion of each of the internal electrodes 2 and 3 penetrates through a glass tube 1 to project out of the glass tube 1 so as to serve as electrode terminals. In the structure mentioned above, the glass tube 1 is sealed. A fluorescent material is applied to the inner wall of the glass tube 1. Typically, neon and argon is sealed in the glass tube 1, which is hermetically sealed, at a rate of, for example, 95:5 or 80:20 such that the overall pressure inside the glass tube 1 is between $10.7 \times 10^3$ and $5.3 \times 10^3$ Pa ($\approx$ between 80 and 40 Torr), and several milligrams of mercury is also preferably sealed in the glass tube 1. Instead of mercury, xenon may be sealed in the glass tube 1.

In the cold-cathode tube lamp shown in FIG. 2A, an external electrode 4 is provided at the internal electrode 2-side end of the glass tube 1, and a projecting portion of the internal electrode 2 and the external electrode 4 are soldered to each other with a solder 5. The external electrode 4 may specifically be formed of metal paste, metal foil, a metal cap, or the like. The solder 6 may be omitted if sufficient electrical connection is established between the projection of the internal electrode 2 and the external electrode 4.

The first feeding member shown in FIG. 2B is formed of an elastic metal member 8A and an insulating layer 8B that coats the elastic metal member 8A, and it pinches and holds the external electrode 4 of the cold-cathode tube lamp shown in FIG. 2A by exploiting the elasticity of the elastic metal member 8A. The insulating layer 8B that is formed as a coating over the elastic metal member 8A needs to be formed at least so as to prevent direct contact between the elastic metal member 8A and the external electrode 4 of the cold-cathode tube lamp.

Instead of the structure shown in FIG. 2B, a structure may be adopted in which the first feeding member is a conductive member that is not in contact with the external electrode 4 of the cold-cathode tube lamp, and further, a holder for holding the cold-cathode tube lamp may be provided in the illuminating unit such that the external electrode 4 of the cold-cathode tube lamp and the conductive member forms a capacitor. This structure, however, has disadvantages that the distance between the electrodes of the capacitor formed of the external electrode 4 of the cold-cathode tube lamp and the conductive member is unstable and that there is an increased possibility of electric discharge occurring between the external electrode 4 of the cold-cathode tube lamp and the conductive member, and thus the structure shown in FIG. 2B is more preferable.

The second feeding member is a harness (which is also referred to as "lead wire") that is connected to an outer lead of the internal electrode 3 of the cold-cathode tube lamp.

Figure 3A:
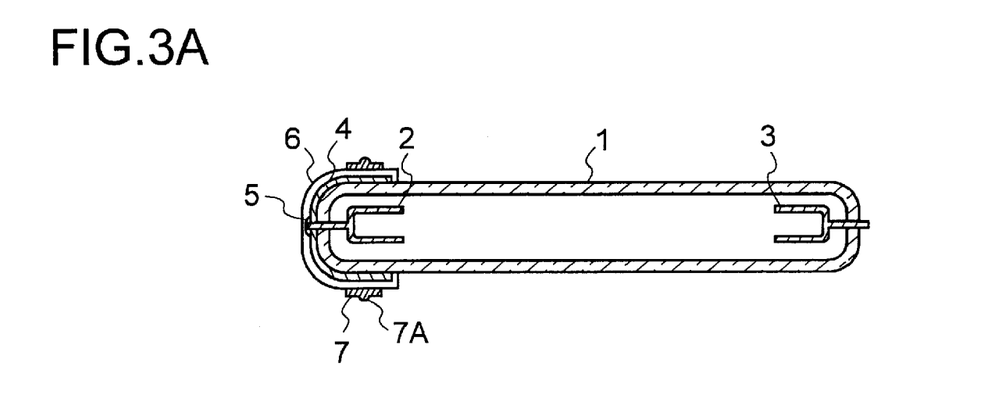
FIG. 3A is a diagram showing another example of the structure of the illuminating unit incorporated in the illuminating apparatus for a display device according to a preferred embodiment of the present invention.
Figure 3B:
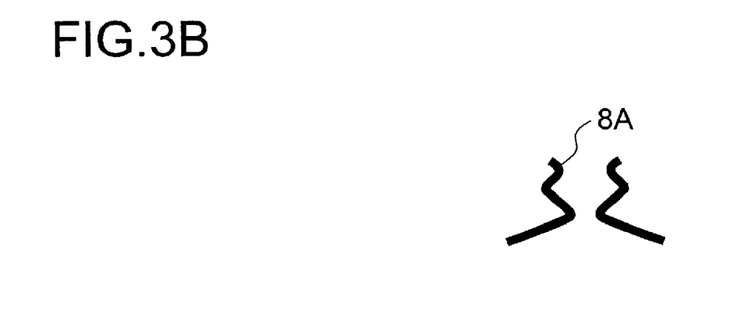
FIG. 3B is a diagram showing another example of the structure of the illuminating unit incorporated in the illuminating apparatus for a display device according to a preferred embodiment of the present invention.

Another example of the structure of the above-described illuminating units incorporated in the illuminating apparatus for a display device according to a preferred embodiment of the present invention is a structure provided with a cold-cathode tube lamp whose section structure is illustrated in FIG. 3A, and a first and a second feeding member shown in FIG. 3B. In FIGS. 3A and 3B, the parts that are the same as those of FIGS. 2A and 2B are marked with the same reference numerals and their detailed description will be omitted.

In the cold-cathode tube lamp shown in FIG. 3A, an insulating layer 6 is formed on the external electrode 4, and a belt shaped counter electrode 7 is formed on the insulating layer 6. The external electrode 4 is completely enclosed by the glass tube 1 and the insulating layer 6.

Furthermore, in the cold-cathode tube lamp shown in FIG. 3A, a ring shaped projection 7A is formed in the belt shaped counter electrode 7 so as to secure electrical connection between the counter electrode 7 and the first feeding member shown in FIG. 3B.

The first feeding member shown in FIG. 3B is formed of the elastic metal member 8A, and it pinches and holds the projection 7A of the counter electrode of the cold-cathode tube lamp shown in FIG. 3A by exploiting the elasticity of the elastic metal member 8A.

The second feeding member is a harness (which is also referred to as "lead wire") that is connected to an outer lead of the internal electrode 3 of the cold-cathode tube lamp.

Figure 4:
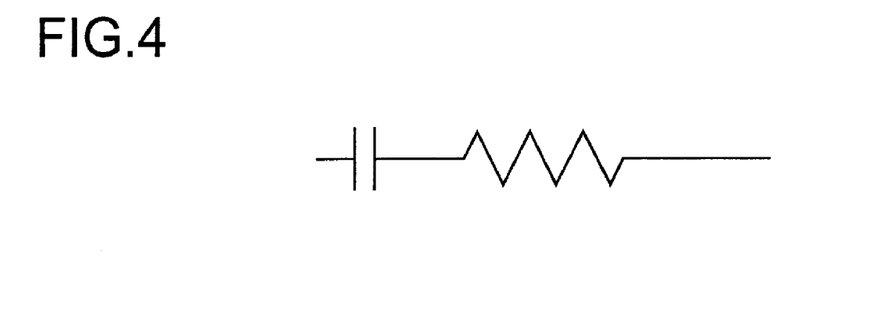
FIG. 4 is a diagram showing an equivalent circuit of the illuminating unit incorporated in the illuminating apparatus for a display device according to a preferred embodiment of the present invention.

As shown in FIG. 4, the equivalent circuits of the illuminating units of the two examples described above are both a series combination of a negative resistor and a capacitor connected to an end of the negative resistor. The side with the capacitor corresponds to the internal electrode 2-side of the cold-cathode tube lamp, and the side without the capacitor corresponds to the internal electrode 3-side of the cold-cathode tube lamp.

Figure 5:
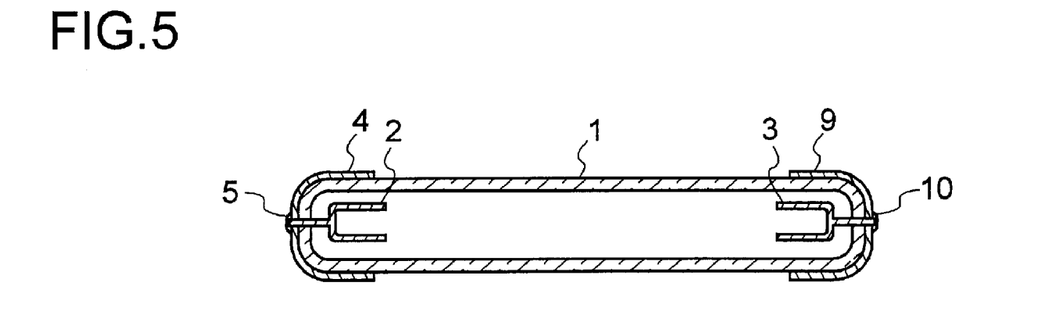
FIG. 5 is a sectional view schematically showing a cold-cathode tube lamp capable of being directly held at both ends thereof.
Figure 6:
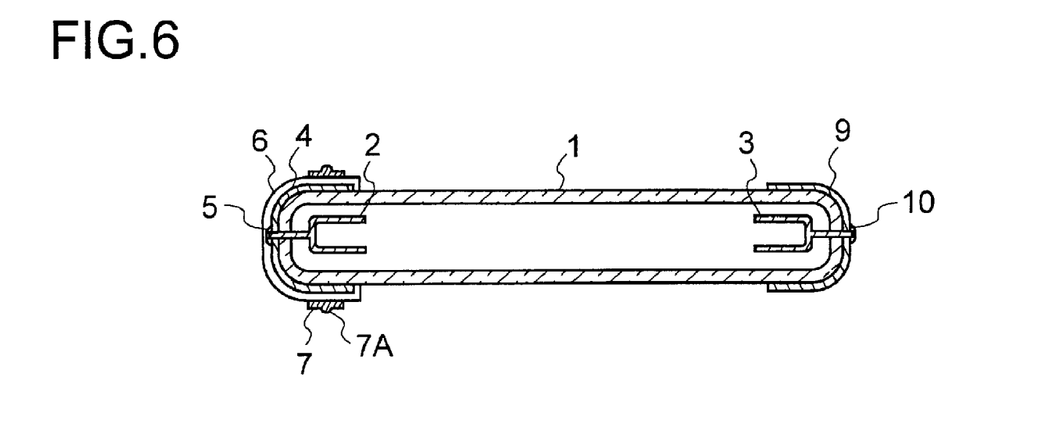
FIG. 6 is a sectional view schematically showing a cold-cathode tube lamp capable of being directly held at both ends thereof.

The illuminating units of the two examples described above may be modified in the following manner. That is, in the cold-cathode tube lamps shown in FIGS. 2A and 3A, an external electrode 9 is formed on the internal electrode 3-side end of the glass tube 1, and the projection of the internal electrode 3 and the external electrode 9 are soldered to each other with a solder 10, and thereby a structure shown in FIG. 5 or a structure shown in FIG. 6 is formed. Specifically, the external electrode 9 may be formed of metal paste, metal foil, a metal cap, or the like. The solder 10 may be omitted if sufficient electrical connection is established between the projection of the internal electrode 3 and the external electrode 9. Also, a structure may be adopted in which the second feeding member is a holder formed of an elastic metal member (e.g., spring steel) instead of the harness (which is also referred to as "lead wire") that is connected to the outer lead of the internal electrode 3 of the cold-cathode tube lamp, and the holder pinches and holds the external electrode 9 by exploiting its elasticity. This facilitates the attaching and the detaching of cold-cathode tube lamps.

Figure 1A:
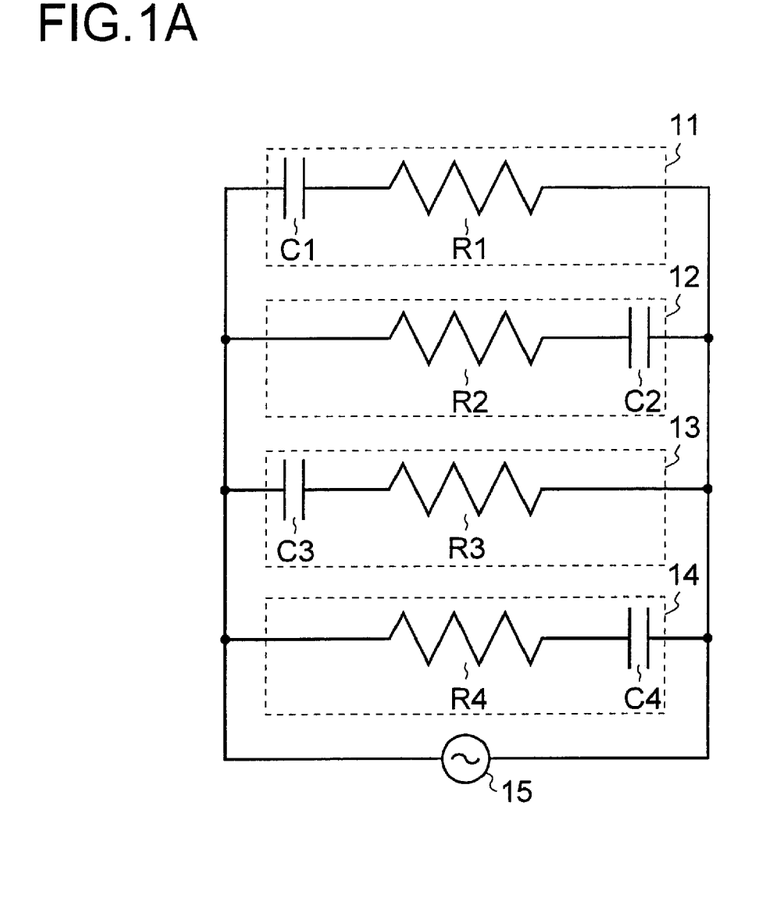
FIG. 1A is a diagram showing an equivalent circuit of an illuminating apparatus for a display device according to a preferred embodiment of the present invention.
Figure 1B:
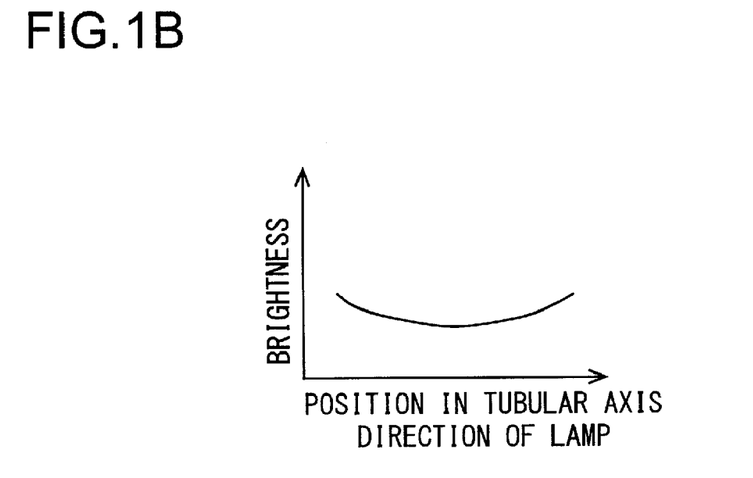
FIG. 1B is a diagram showing the distribution of brightness of the illuminating apparatus for a display device according to a preferred embodiment of the present invention.

FIG. 1A shows an example of the electrical structure of the illuminating apparatus for a display device according to a preferred embodiment of the present invention. In the illuminating apparatus for a display device according to a preferred embodiment of the present invention, the illuminating units (whose equivalent circuits are shown as the equivalent circuits 11 to 14 in FIG. 1A) are connected in parallel to one another, and power is supplied to each of them from the power supply apparatus 15.

In the example of the electrical structure shown in FIG. 1A, the illuminating units are arranged such that the capacitors C1 to C4, which are components of the equivalent circuits 11 to 14 of the illuminating units, respectively, alternate in position every one cold-cathode tube lamp such that the number of the illuminating units in each of which the capacitor (a component of the equivalent circuit) is disposed in one position in the tubular axis direction of the cold-cathode tube lamp is equal to the number of the illuminating apparatuses in each of which the capacitor (a component of the equivalent circuit) is disposed in a counter position that is opposite to the one position in the tubular axis direction of the cold-cathode tube lamp.

As a result, stray capacitors through which a leakage current flows can be symmetrically located in the one and the counter positions. Hence, the brightness gradient of the illuminating apparatus, seen as a whole, is symmetrical between the one and the counter positions, which results in a lower gradient of brightness. The stray capacitors through which a leakage current flows are dispersedly located in the one and counter positions, and this helps prevent noise and sounding from occurring at a position in a concentrated manner.

In the preferred embodiments described above, the illuminating units are preferably arranged such that the capacitors C1 to C4, which are components of the equivalent circuits 11 to 14 of the illuminating units, respectively, alternate in position every one cold-cathode tube lamp. Instead of this arrangement, they may be arranged such that the capacitors C1 to C4 alternate in position every plurality of cold-cathode tube lamps.

In the preferred embodiments described above, the number of the illuminating units in each of which the capacitor (which is a component of the equivalent circuit) is disposed in one position in the tubular axis direction of the cold-cathode tube lamp is equal to the number of the illuminating apparatuses in each of which the capacitor (which is a component of the equivalent circuit) is disposed in a counter position that is opposite to the one position. This arrangement, however, is not meant to limit the present invention, and any arrangement is acceptable as long as at least one of the illuminating units has its capacitor (which is a component of its equivalent circuit) positioned oppositely to the capacitors (which are components of the equivalent circuits) of the other illuminating units.

In a structure where the number of the illuminating units in each of which the capacitor (a component of the equivalent circuit) is disposed in one position in the tubular axis direction of the cold-cathode tube lamp is not equal to the number of the illuminating apparatuses in each of which the capacitor (a component of the equivalent circuit) is disposed in a counter position that is opposite to the one position, the brightness gradient is higher than in the structure where the numbers are equal, but can be lower than in the structure shown in FIG. 8A.

The display device according to another preferred embodiment of the present invention is provided with the illuminating apparatus for a display device according to a preferred embodiment of the present invention described above and a display panel. A specific preferred embodiment of the display device of the present invention is, for example, a transparent liquid crystal display device incorporating the illuminating apparatus for a display device according to a preferred embodiment of the present invention described above as a backlight unit, in front of which a liquid crystal panel is provided.

Figure 7:
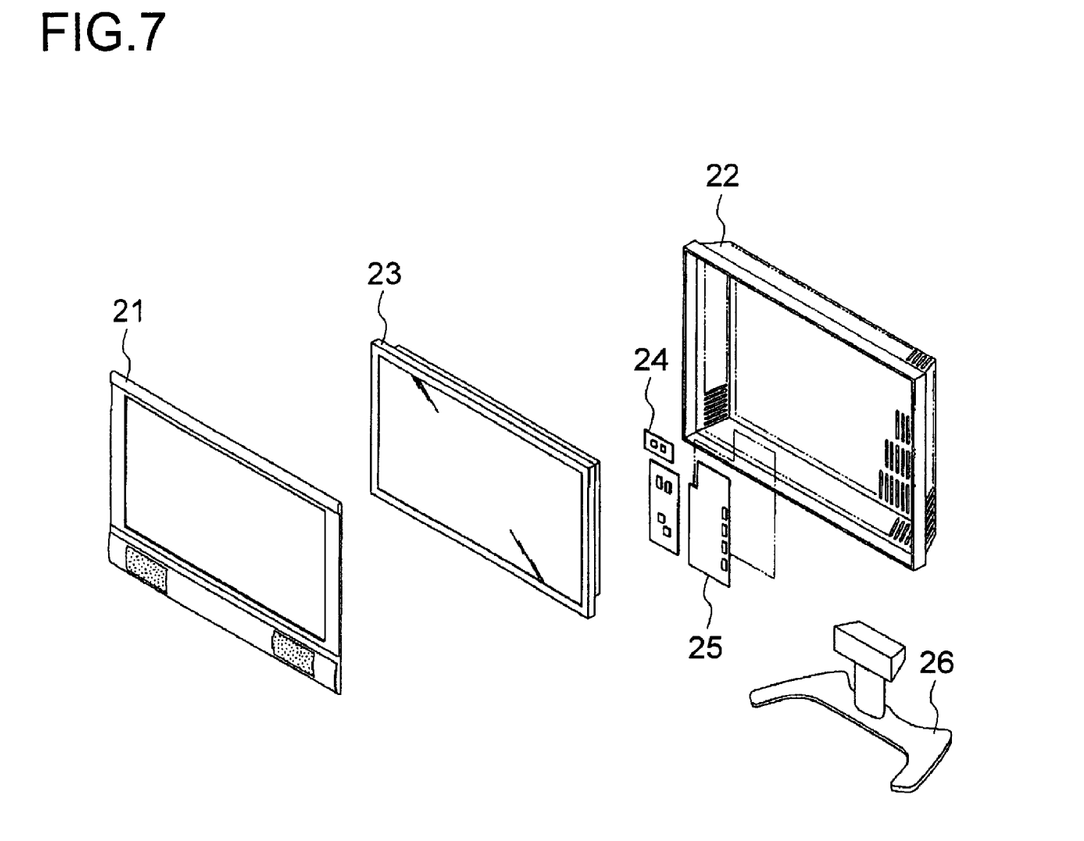
FIG. 7 is a developed perspective view showing a liquid crystal television receiver as an example of the display device according to a preferred embodiment of the present invention.

FIG. 7 is an example of a perspective view where the display device according to a preferred embodiment of the present invention is a liquid crystal television receiver. A transparent liquid display portion 23, a tuner 24, and a power supply 25 are accommodated between a front cabinet 21 and a rear cabinet 22, and the rear cabinet 22 is supported by a stand 26. The transparent liquid crystal display portion 23 incorporates the illuminating apparatus for a display device according to a preferred embodiment of the present invention as a backlight unit, in front of which a liquid crystal display panel is provided.

The illuminating apparatus for a display device according to a preferred embodiment of the present invention can be used as illuminating apparatuses for various display devices such as a backlight for a liquid crystal television receiver.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illuminating apparatus for a display device, comprising:
   a plurality of illuminating units including:
      a first feeding member;
      a second feeding member; and
      a cold-cathode tube lamp to which power is supplied from a power supply apparatus via the first and second feeding members;
   an equivalent circuit of each of the illuminating units being a series combination of a negative resistor and a capacitor connected to an end of the negative resistor; wherein
   at least one of the illuminating units is arranged such that the capacitor thereof is opposite in position to the capacitor of each of other ones of the illuminating units; and
   a number of the illuminating units, the capacitor of each of which is disposed in one position in a direction of a tubular axis of the cold-cathode tube lamp, is equal to a number of the illuminating units, the capacitor of each of which is disposed in a counter position that is opposite to the one position, the capacitor being a component of the equivalent circuit.

2. The illuminating apparatus for a display device of claim 1, wherein a position of the capacitor alternates every predetermined number of the cold-cathode tube lamp.

3. The illuminating apparatus for a display device of claim 2, wherein the predetermined number is one.

4. A display device, comprising:
   the illuminating apparatus for a display device of claim 1.

5. The display device of claim 4, wherein the display device is a television receiver.

* * * * *